United States Patent
Sankruthi

(10) Patent No.: US 9,792,436 B1
(45) Date of Patent: Oct. 17, 2017

(54) TECHNIQUES FOR REMEDIATING AN INFECTED FILE

(71) Applicant: Symantec Corporation, Mountain View, CA (US)

(72) Inventor: Anand D. Sankruthi, Bangalore (IN)

(73) Assignee: Symantec Corporation, Mountain View, CA (US)

(*) Notice: Subject to any disclaimer, the term of this patent is extended or adjusted under 35 U.S.C. 154(b) by 411 days.

(21) Appl. No.: 13/872,623

(22) Filed: Apr. 29, 2013

(51) Int. Cl.
*G06F 21/56* (2013.01)
*G06F 21/64* (2013.01)

(52) U.S. Cl.
CPC .......... *G06F 21/568* (2013.01); *G06F 21/64* (2013.01)

(58) Field of Classification Search
CPC ............................ G06F 64/568; G06F 21/64
See application file for complete search history.

(56) References Cited

U.S. PATENT DOCUMENTS

| | | | | |
|---|---|---|---|---|
| 6,094,731 A * | 7/2000 | Waldin | ................... | G06F 21/564 714/2 |
| 7,367,056 B1 * | 4/2008 | Szor et al. | ...................... | 726/24 |
| 7,373,519 B1 * | 5/2008 | Nachenberg | ............ | G06F 21/57 380/46 |
| 7,478,431 B1 * | 1/2009 | Nachenberg | .......... | G06F 21/565 713/175 |
| 7,797,323 B1 * | 9/2010 | Eshghi | .............. | G06F 17/30156 707/737 |
| 7,971,249 B2 * | 6/2011 | Horne | ............................. | 726/22 |
| 8,365,283 B1 * | 1/2013 | Satish | .................. | G06F 21/564 713/152 |
| 8,473,461 B1 * | 6/2013 | Woirhaye | ................ | G06F 21/10 705/59 |
| 8,671,397 B2 * | 3/2014 | Kalman | .............. | G06F 11/3604 717/131 |
| 8,719,935 B2 * | 5/2014 | Polyakov et al. | .............. | 726/23 |
| 8,819,644 B2 * | 8/2014 | Kalman | .............. | G06F 11/3604 717/132 |
| 9,009,822 B1 * | 4/2015 | Ismael et al. | .................... | 726/22 |
| 2003/0046558 A1 * | 3/2003 | Teblyashkin | .......... | G06F 21/564 713/188 |

(Continued)

OTHER PUBLICATIONS

Daoud et al. "Computer Virus Strategies and Detection Methods," Int. J. Open Problems Compt. Math., vol. 1, No. 2, Sep. 2008.*

*Primary Examiner* — Robert Leung
(74) *Attorney, Agent, or Firm* — Wilmer Cutler Pickering Hale and Dorr LLP

(57) ABSTRACT

Techniques for remediating an infected file are disclosed. In one embodiment, a method may have the steps of maintaining a plurality of file identities within a remediation repository each associated with a file, wherein for each file identity one or more regions of interest of the associated file are selectively identified, the one or more regions of interest for each file collectively representing less than all of the file; in response, selecting a file associated with a file identity from the remediation repository that matches the infected file; selectively comparing the one or more regions of interest of the matching file with one or more corresponding regions of the infected file; and based on comparing the regions, replacing at least one portion of the one or more regions of the infected file with at least one corresponding portion of the one or more regions of interest of the matching file.

18 Claims, 4 Drawing Sheets

(56) References Cited

U.S. PATENT DOCUMENTS

| | | | |
|---|---|---|---|
| 2004/0068664 A1* | 4/2004 | Nachenberg | G06F 21/564 726/24 |
| 2006/0161761 A1* | 7/2006 | Schwartz et al. | 711/216 |
| 2006/0195745 A1* | 8/2006 | Keromytis | G06F 11/0742 714/741 |
| 2007/0240218 A1* | 10/2007 | Tuvell et al. | 726/24 |
| 2007/0240222 A1* | 10/2007 | Tuvell et al. | 726/24 |
| 2007/0266436 A1* | 11/2007 | Ballard | G06F 21/562 726/24 |
| 2009/0019547 A1* | 1/2009 | Palliyil et al. | 726/25 |
| 2010/0023810 A1* | 1/2010 | Stolfo | G06F 11/0718 714/38.11 |
| 2010/0031361 A1* | 2/2010 | Shukla | 726/24 |
| 2010/0153785 A1* | 6/2010 | Keromytis | G06F 11/08 714/38.11 |
| 2010/0235916 A1* | 9/2010 | Radatti | 726/24 |
| 2010/0262584 A1* | 10/2010 | Turbin | G06F 21/564 707/674 |
| 2010/0293142 A1* | 11/2010 | Ackerman | H04L 67/06 707/640 |
| 2011/0173698 A1* | 7/2011 | Polyakov | G06F 11/0748 726/23 |
| 2011/0185424 A1* | 7/2011 | Sallam | G06F 21/566 726/23 |
| 2011/0246734 A1* | 10/2011 | Umbehocker | G06F 3/0608 711/162 |
| 2012/0066229 A1* | 3/2012 | Carter | 707/747 |
| 2012/0151036 A1* | 6/2012 | Detro | H04L 41/0853 709/224 |
| 2012/0203748 A1* | 8/2012 | Kaminski, Jr. | G06F 17/30864 707/698 |
| 2012/0290870 A1* | 11/2012 | Shah | G06F 21/10 714/4.11 |
| 2013/0014261 A1* | 1/2013 | Millliken et al. | 726/24 |
| 2013/0081002 A1* | 3/2013 | Kalman | G06F 11/3604 717/132 |
| 2013/0081003 A1* | 3/2013 | Kalman | G06F 11/3604 717/132 |
| 2013/0111591 A1* | 5/2013 | Topan | G06F 21/563 726/24 |
| 2014/0068772 A1* | 3/2014 | Topan | G06F 21/563 726/23 |
| 2015/0326585 A1* | 11/2015 | Topan | G06F 21/563 726/24 |

* cited by examiner

TECHNIQUES FOR REMEDIATING AN INFECTED FILE

FIELD OF THE DISCLOSURE

The present disclosure relates generally to computer security and, more particularly, to techniques for remediating an infected file.

BACKGROUND OF THE DISCLOSURE

A virus is a type of malicious code that spreads by injecting copies of itself into computer files so that, when a computer system accesses these "infected" files, the virus code is also executed. Because infected files may be needed for proper system execution, it is desirable to be able to remediate the files and restore them to a usable, uninfected state.

The state of the art for remediation of infected files only covers a small percentage of file infections. If the specific malware responsible for the infection is known, a repair script can be developed for that particular infection. The repair script is uniquely generated for each specific malware infection and is used when that specific infection can be identified. Because the repair script is limited to the positive identification of a particular infection, it is not effective in situations where an infection is identified but the particular malware is unknown. Infections by newly introduced malware cannot be treated in this fashion until the malware has become known and a repair script has been generated for that particular malicious code. In practice, even a large collection of repair scripts can only remediate a fraction of infected files.

If the file happens to be a well-known system file, then it may be possible to replace the entire file using a cloud repository. If the file is not found in the cloud, as is often the case, then remediation fails.

In view of the foregoing, it may be understood that there may be significant problems and shortcomings associated with current file remediation technologies.

SUMMARY OF THE DISCLOSURE

Techniques for remediating an infected file are disclosed. In one particular embodiment, a method for remediating an infected file may comprise the steps of: maintaining a plurality of file identities within a remediation repository each associated with a file, wherein for each file identity one or more regions of interest of the associated file are selectively identified, the one or more regions of interest for each file collectively representing less than all of the file; in response to identifying an infected file, selecting a file associated with a file identity from the remediation repository that matches the infected file; selectively comparing the one or more regions of interest of the matching file with one or more corresponding regions of the infected file; and based on comparing the regions, replacing at least one portion of the one or more regions of the infected file with at least one corresponding portion of the one or more regions of interest of the matching file.

In accordance with other aspects of this particular embodiment, the file identity for the matching file includes one or more hash values for one or more portions of the one or more regions of interest of the matching file; selectively comparing the one or more regions of interest comprises comparing one or more hash values for one or more portions of the one or more corresponding regions of the infected file with the one or more hash values stored in the file identity for the one or more portions of the one or more regions of interest of the matching file; and replacing the at least one portion based on comparing the regions comprises identifying and replacing each portion where the corresponding hash values between the infected file and the matching file are different.

In accordance with further aspects of this particular embodiment, the matching file includes at least a first portion with a first hash value and a second portion with a second hash value; and the first portion and the second portion are different sizes.

In accordance with further aspects of this particular embodiment, the sizes of the first and second portions are based on the relative vulnerability to infection of the first portion and the second portion.

In accordance with further aspects of this particular embodiment, the first portion is part of a first region of interest, and the second portion is part of a second region of interest; and the sizes of the first and second portions are based on the sizes of the first and second regions of interest.

In accordance with further aspects of this particular embodiment, the sizes of the first and second portions are based on a maximum number of hash values permitted for the file identity associated with the matching file.

In accordance with other aspects of this particular embodiment, the matching file is an executable file, and at least one region of the one or more regions of interest represents a main entry point.

In accordance with other aspects of this particular embodiment, the matching file is a shared library file, and wherein at least one region of the one or more regions of interest represents a function entry point.

In accordance with other aspects of this particular embodiment, selecting the matching file associated with a file identity from the remediation repository comprises matching a file name and at least one of a file version, file size, file header information, and file path of the file identity of the matching file with the corresponding parameters of the infected file.

In accordance with other aspects of this particular embodiment, replacing the at least one portion based on comparing the regions comprises: identifying a client device having the matching file; requesting a copy of the matching file from the client device; receiving a copy of the matching file from the client device in response to the request; and copying the at least one portion from the received copy.

In accordance with further aspects of this particular embodiment, the client device is identified based on file information within the file identity.

In accordance with other aspects of this particular embodiment, the remediation repository includes a file identity associated with the infected file; and the method further comprises, in response to identifying the infected file as infected, designating the file as infected within the associated file identity.

In accordance with further aspects of this particular embodiment, the method further comprises, after replacing the at least one portion based on comparing the regions, removing the designation of the file as infected from within the associated file identity.

In another particular embodiment, the techniques may be realized as a method for remediating an infected file comprising the steps of: maintaining a plurality of file identities within a remediation repository each associated with a file, wherein for each file identity one or more regions of interest of the associated file are selectively identified, the one or more regions of interest for each file collectively representing less than all of the file; in response to identifying an infected file, searching for a file associated with a file identity from the remediation repository that matches the infected file; selecting a matching file that is not associated with a file identity from the remediation repository; in response to selecting the matching file, creating a file identity and associating the file identity with the matching file; selectively identifying one or more regions of interest of the matching file, the one or more regions of interest collectively representing less than all of the file; selectively comparing the one or more regions of interest of the matching file with one or more corresponding regions of the infected file; and based on comparing the regions, replacing at least one portion of the one or more regions of the infected file with at least one corresponding portion of the one or more regions of interest of the matching file.

In accordance with other aspects of this particular embodiment, the matching file is downloaded from a file source associated with the infected file.

In accordance with further aspects of this particular embodiment, the file source is referenced in a file identity within the remediation repository that is associated with the infected file.

In accordance with further aspects of this particular embodiment, wherein the matching file is located in a file repository.

In accordance with other aspects of this particular embodiment, the file identity for the matching file includes one or more hash values for one or more portions of the one or more regions of interest of the matching file; selectively comparing the one or more regions of interest comprises comparing one or more hash values for one or more portions the one or more corresponding regions of the infected file with the one or more hash values stored in the file identity for the one or more portions of the one or more regions of interest of the matching file; and replacing the at least one portion based on comparing the regions comprises identifying and replacing each portion where the corresponding hash values between the infected file and the matching file are different.

In another particular embodiment, the techniques may be realized as at least one non-transitory processor readable storage medium storing a computer program of instructions configured to be readable by at least one processor for instructing the at least one processor to execute a computer process for performing a method for managing data storage comprising the steps of: maintaining a plurality of file identities within a remediation repository each associated with a file, wherein for each file identity one or more regions of interest of the associated file are selectively identified, the one or more regions of interest for each file collectively representing less than all of the file; in response to identifying an infected file, selecting a file associated with a file identity from the remediation repository that matches the infected file; selectively comparing the one or more regions of interest of the matching file with one or more corresponding regions of the infected file; and based on comparing the regions, replacing at least one portion of the one or more regions of the infected file with at least one corresponding portion of the one or more regions of interest of the matching file.

In another particular embodiment, the techniques may be realized as a system for remediating an infected file comprising: one or more processors communicatively coupled to a network; wherein the one or more processors are configured to: maintain a plurality of file identities within a remediation repository each associated with a file, wherein for each file identity one or more regions of interest of the associated file are selectively identified, the one or more regions of interest for each file collectively representing less than all of the file; in response to identifying an infected file, select a file associated with a file identity from the remediation repository that matches the infected file; selectively compare the one or more regions of interest of the matching file with one or more corresponding regions of the infected file; and based on comparing the regions, replace at least one portion of the one or more regions of the infected file with at least one corresponding portion of the one or more regions of interest of the matching file.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
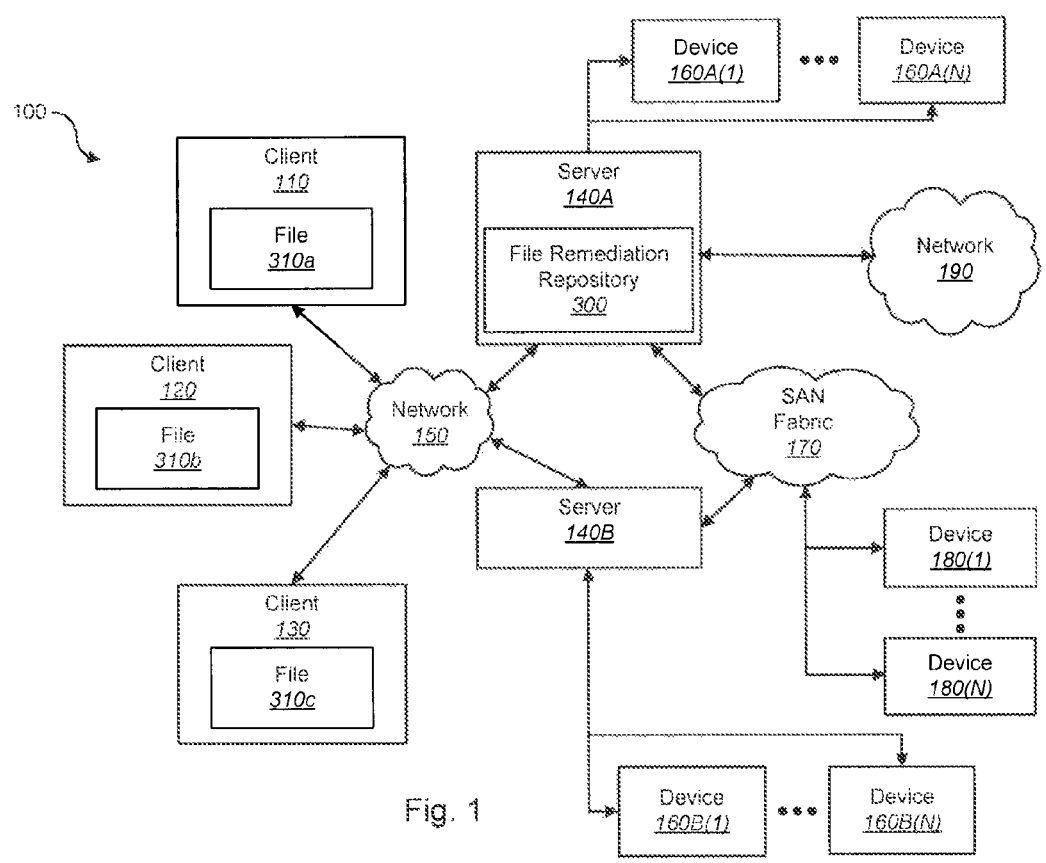
FIG. 1 shows a block diagram depicting a network architecture in accordance with an embodiment of the present disclosure.

FIG. 1 shows a block diagram depicting a network architecture for file remediation in accordance with an embodiment of the present disclosure.

FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a remediation repository (e.g., file remediation repository 300 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Client systems 110, 120, and 130 may include copies of files (including files 310*a*, 310*b*, and 310*c* respectively that are represented in file remediation repository 300 as further described below).

Figure 2:
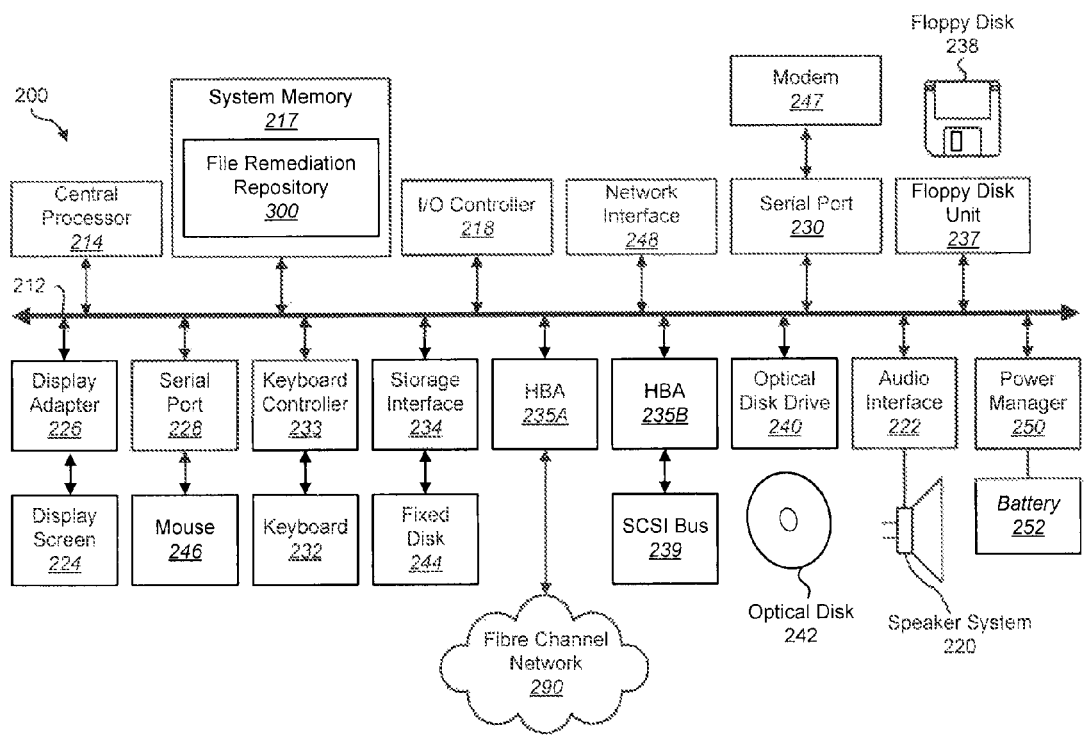
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. In some embodiments, server 140A may be a host that manages storage of data, including application data, in a multi-tiered environment. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, servers 140A and 140B may contain one or more portions of software for software security such as, for example, file remediation repository 300. Further, one or more portions of the file remediation repository 300 may reside at a network centric location. For example, server 140A may be a server, a firewall, a gateway, or other network element that may perform one or more actions to support virus detection and file remediation. According to some embodiments, network 190 may be an external network (e.g., the Internet) and server 140A may be a gateway or firewall between one or more internal components and clients and the external network. According to some embodiments, file remediation including a file remediation repository 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, file remediation repository 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
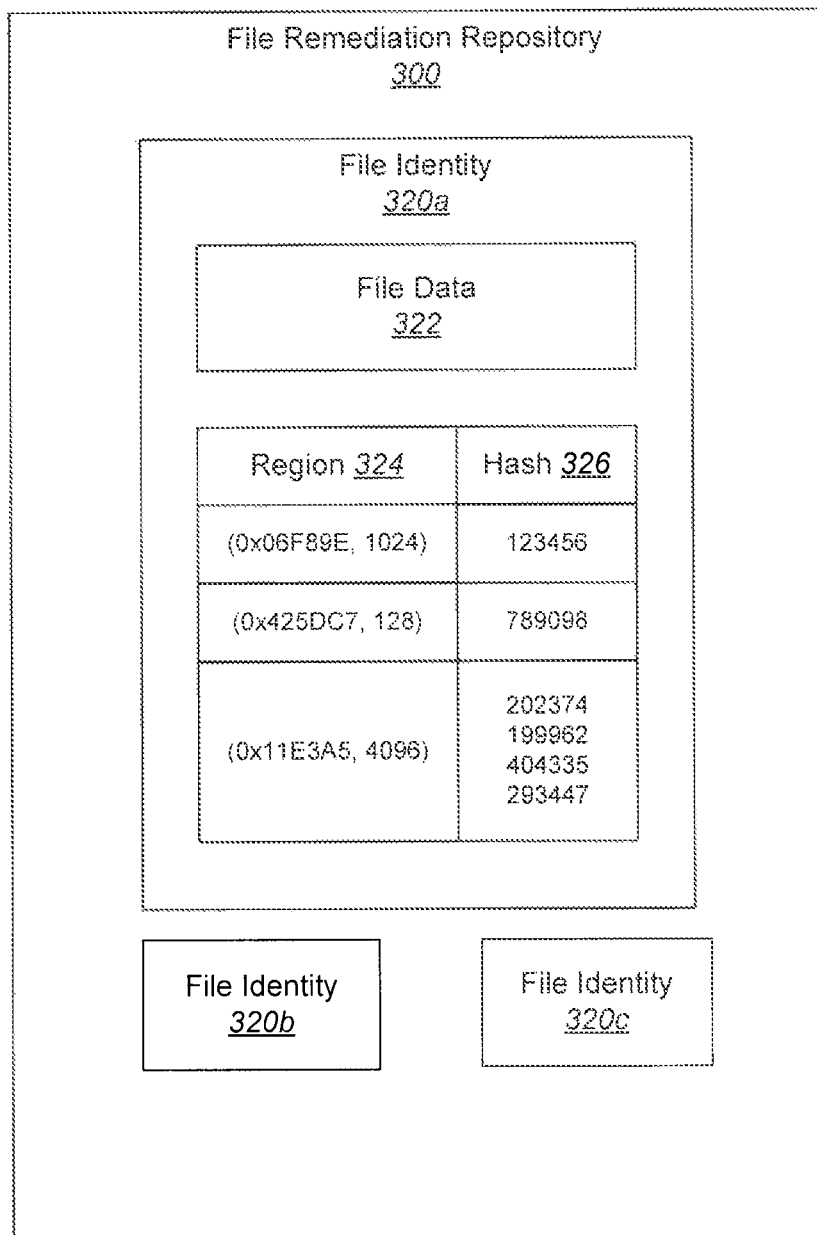
FIG. 3 shows a file remediation repository in accordance with an embodiment of the present disclosure.

FIG. 3 shows a file remediation repository 300 in accordance with an embodiment of the present disclosure. As illustrated, the file remediation repository 300 includes file identities 320a-c each associated with a particular file 310a-c residing on a client device 110, 120, or 130.

Each file identity 320 within the file remediation repository 300 may include file data 322 about its associated file. File data 322 may include, for example: file name, file version, file size, OS name, OS version, client hostname, client IP address, file path, file source, and file header information. Some or all of these fields may not be included for all file identities 320 within the repository, and some file identities may include additional information.

The type of file 310 associated with a particular file identity 320 may determine which information is included within the file data 322. For example, an executable or shared library file may include version information while other files may not. File source information may include information about where the file was originally downloaded or copied from, and this may not be available for all files. The file header information may include architecture, language, version, linker, and other data and may vary according to what information is available in each particular file header, as well as which header format is used.

In addition to file information, each file identity 320 includes information identifying one or more regions of interest 324 for that file. These regions of interest 324 may represent only a small fraction of the total file and may represent the points in the file most vulnerable to viral infection. An executable file, for example, may have a single region of interest 324 representing the main entry point. As another example, a shared library may have multiple regions of interest 324, each representing the entry point of a different function within the library. FIG. 3 illustrates the file identity 320a having three regions of interest, each designated by a value pair representing the offset from the beginning of the file where the region starts, and the length of the region.

The file identity 320 stores hash values 326 for the one or more regions of interest 324. In some implementations, the regions of interest 324 may be further divided up into smaller portions and hash values 326 recorded for each of those portions. The size of the portions that are hashed may depend on a number of factors. If the total size of the regions of interest 324 is larger, larger portions may be hashed so as to reduce the total number of hash values 326 calculated for each file identity 320. In some implementations, there may be a maximum number of hash values 326 per file identity 320. Additionally, the likelihood of infection may be taken into account so that parts of the regions of interest 324 that are particularly likely to be infected by a virus may be divided into more and smaller portions than less vulnerable parts. FIG. 3 illustrates a single hash value 326 for the first two listed regions 324, and four hash values 326 for portions of the third listed region 324.

Figure 4:
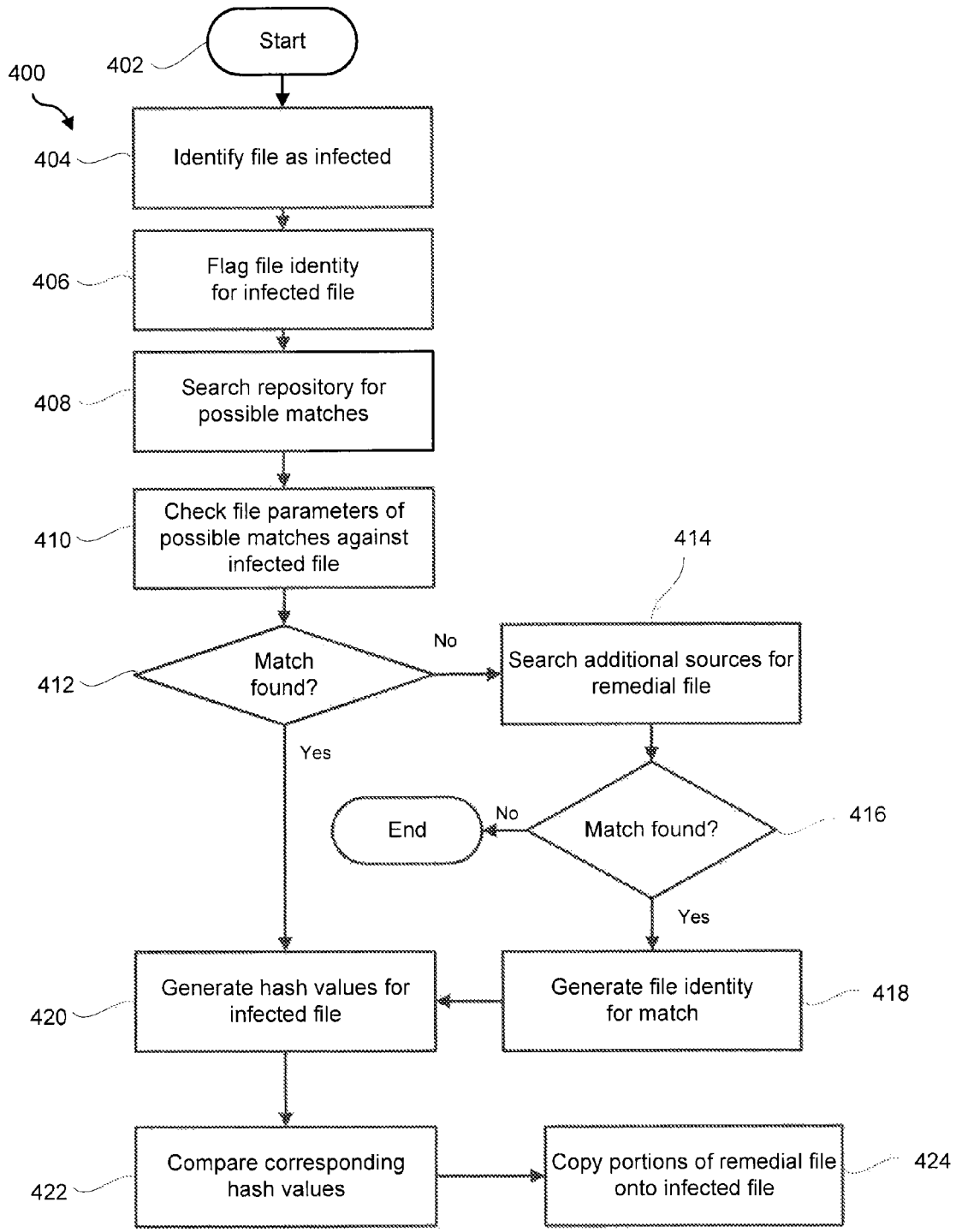
FIG. 4 shows a method for remediating an infected file in accordance with an embodiment of the present disclosure.

FIG. 4 shows a method 400 for remediating an infected file in accordance with an embodiment of the present disclosure. A block 402, the method 400 may begin.

At block 404, a file is identified as infected and designated for remediation. Any method of virus detection may be used to identify the file as infected, including methods that rely on recognizing the structure of known viruses and methods that rely on statistical or other analysis to detect behavior attributed to malicious code. As used herein, an "infected file" is any file designated for remediation because of a detected or suspected infection, even files that are not actually infected.

At block 406, the file identity associated with the infected file is flagged in the remediation repository to mark it as associated with an infected file. Only file identities in the file remediation repository that are not flagged as associated with infected files are eligible to be used for remediation.

At block 408, the system searches the file remediation repository for possible matches. This initial search may involve finding, for example, file identities with file names that match the name of the infected file.

At block 410, other parameters of the possible matches are checked against the infected file. For example, file version, file size, file header information, and the file path may be compared. A file may be matched even though it is not identical to the infected file in all of the listed parameters. However, in some implementations, an evaluation is made to determine which of many possible matches to use. The evaluation may involve determining if certain information of the infected file, such as version number, appears to be genuine, and matching a file with the same version information. Should it appear that the version number or other information has been tampered with, then the evaluation may involve comparing parameters such as file length as well as hash values for the one or more regions of the interest and selecting the file that matches the infected file most closely.

At decision block 412, the system checks to see if a match has been made. If not, then additional sources may be checked for a remedial file (block 414). For instance, if file source information is known for the infected file, then the system may attempt to retrieve of a copy of the file from the source. Other sources, such as third party repositories, may also be used if necessary.

At decision block 416, if the additional sources also fail to provide a sufficient match, then the remediation attempt fails. Other methods, such as quarantining the file and re-installing one or more programs, may be necessary to deal with the infection.

At block 418, if the additional sources provide a file that can be used as a match, then a file identity may be created for the retrieved file. This newly created file identity may have the same information as file identities for files in the computer network, or may have only a limited subset of that information. As part of creating the file identity, regions of interest may be identified for the file and hash values may be calculated for portions of the identified regions of interest, just as described above. The newly-created file identity may then be treated the same as if a file identity in the remediation repository had matched, as further described herein.

At block 420, hash values are generated for the portions of the infected file that match the portions of the one or more regions of interest of the matched file.

At block 422, each corresponding pair of hash values for the infected file and the matched file are compared. The portions of the infected file having different hash values than the corresponding portions of the matched file are designated for replacement.

A block 424, the client having the matched file sends a copy of the matched file for use in remediation. The designated portions of the infected file are replaced with the corresponding portions of the infected file.

The newly-remediated file may be treated in a variety of ways. In some implementations, the remediated file may be submitted to further scans or scrutiny to determine the success of the remediation, and further measures may be taken if it appears to still be infected. In some implementations, the remediated file may be returned to its location and its behavior monitored to see if it acts as malicious code or as expected. The file identity for the remediated file may be immediately cleared of its previous mark indicating infection, or may only be cleared after further evaluations of its status are made.

At this point it should be noted that file remediation techniques in accordance with the present disclosure as described above may involve the processing of input data and the generation of output data to some extent. This input data processing and output data generation may be implemented in hardware or software. For example, specific electronic components may be employed in a file remediation repository or similar or related circuitry for implementing the functions associated with file remediation in accordance with the present disclosure as described above. Alternatively, one or more processors operating in accordance with instructions may implement the functions associated with file remediation in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for remediating an infected file comprising the steps of:
   maintaining a plurality of file identities within a remediation repository each associated with a file, wherein for each file identity one or more regions of interest of the associated file are selectively identified, the one or more regions of interest for each file collectively representing less than all of the file;
   in response to identifying an infected file, selecting a file associated with a file identity from the remediation repository that matches the infected file;
   selectively comparing at least one of a plurality of portions of the one or more regions of interest of the matching file with one or more corresponding portions of regions of the infected file; and
   based on selectively comparing the portions of the regions, replacing at least one of the plurality of portions of the one or more regions of the infected file with the at least one corresponding portion of the one or more regions of interest of the matching file,
   wherein portions of the one or more regions of interest that are particularly likely to be infected by a virus are divided into smaller portions than less vulnerable portions prior to the file being identified as infected.

2. The method of claim 1,
   wherein the file identity for the matching file includes one or more hash values for one or more portions of the plurality of portions of the one or more regions of interest of the matching file;
   wherein selectively comparing the plurality of portions of the one or more regions of interest comprises comparing one or more hash values for the one or more corresponding portions of the one or more corresponding regions of the infected file with the one or more hash values stored in the file identity for the one or more portions of the one or more regions of interest of the matching file; and
   wherein replacing the at least one portion of the plurality of portions based on comparing the regions comprises identifying and replacing each portion where the corresponding hash values between the infected file and the matching file are different.

3. The method of claim 2,
   wherein the matching file includes at least a first portion with a first hash value and a second portion with a second hash value; and
   wherein the first portion and the second portion are different sizes.

4. The method of claim 3,
   wherein the first portion is part of a first region of interest, and the second portion is part of a second region of interest; and wherein the sizes of the first and second portions are based on the sizes of the first and second regions of interest.

5. The method of claim 3, wherein the sizes of the first and second portions are based on a maximum number of hash values permitted for the file identity associated with the matching file.

6. The method of claim 1, wherein the matching file is an executable file, and wherein at least one region of the one or more regions of interest represents a main entry point.

7. The method of claim 1, wherein the matching file is a shared library file, and wherein at least one region of the one or more regions of interest represents a function entry point.

8. The method of claim 1, wherein selecting the matching file associated with a file identity from the remediation repository comprises matching a file name and at least one of a file version, file size, file header information, and file path of the file identity of the matching file with the corresponding parameters of the infected file.

9. The method of claim 1, wherein replacing the at least one portion based on comparing the regions comprises:
identifying a client device having the matching file;
requesting a copy of the matching file from the client device;
receiving a copy of the matching file from the client device in response to the request; and
copying the at least one portion from the received copy.

10. The method of claim 9, wherein the client device is identified based on file information within the file identity.

11. The method of claim 1,
wherein the remediation repository includes a file identity associated with the infected file; and
wherein the method further comprises, in response to identifying the infected file as infected, designating the file as infected within the associated file identity.

12. The method of claim 11, further comprising:
after replacing the at least one portion of the plurality of portions based on comparing the regions, removing the designation of the file as infected from within the associated file identity.

13. A method for remediating an infected file comprising the steps of:
maintaining a plurality of file identities within a remediation repository each associated with a file, wherein for each file identity one or more regions of interest of the associated file are selectively identified, the one or more regions of interest for each file collectively representing less than all of the file and wherein each of the one or more regions of interest comprises a plurality of portions of the region of interest;
in response to identifying an infected file, searching for a file associated with a file identity from the remediation repository that matches the infected file;
selecting a matching file that is not associated with a file identity from the remediation repository;
in response to selecting the matching file, creating a file identity and associating the file identity with the matching file;
selectively identifying one or more regions of interest of the matching file, the one or more regions of interest collectively representing less than all of the file;
selectively comparing a plurality of portions of the one or more regions of interest of the matching file with one or more corresponding portions of the corresponding regions of the infected file; and
based on selectively comparing the portions of regions, replacing at least one portion of the plurality of portions of the one or more regions of the infected file with at least one corresponding portion of the one or more regions of interest of the matching file,
wherein portions of the one or more regions of interest that are particularly likely to be infected by a virus are divided into smaller portions than less vulnerable portions prior to the file being identified as infected.

14. The method of claim 13, wherein the matching file is downloaded from a file source associated with the infected file.

15. The method of claim 14, wherein the file source is referenced in a file identity within the remediation repository that is associated with the infected file.

16. The method of claim 13, wherein the matching file is located in a file repository.

17. The method of claim 13,
wherein the file identity for the matching file includes one or more hash values for one or more portions of the one or more regions of interest of the matching file;
wherein selectively comparing the plurality of portions of the one or more regions of interest comprises comparing one or more hash values for portions of the one or more corresponding regions of the infected file with the one or more hash values stored in the file identity for the one or more portions of the one or more regions of interest of the matching file; and
wherein replacing the at least one portion based on comparing the regions comprises identifying and replacing each portion where the corresponding hash values between the infected file and the matching file are different.

18. A system for remediating an infected file comprising:
one or more hardware processors communicatively coupled to a network; wherein the one or more processors are configured to:
maintain a plurality of file identities within a remediation repository each associated with a file, wherein for each file identity a plurality of portions of one or more regions of interest of the associated file are selectively identified, the one or more regions of interest for each file collectively representing less than all of the file;
in response to identifying an infected file, select a file associated with a file identity from the remediation repository that matches the infected file;
selectively compare at least one of the plurality of portions of the one or more regions of interest of the matching file with one or more corresponding portions of regions of the infected file; and
based on selectively comparing the portions of regions, replace at least one portion of a plurality of portions of the one or more regions of the infected file with at least one corresponding portion of the one or more regions of interest of the matching file,
wherein portions of the one or more regions of interest that are particularly likely to be infected by a virus are divided into smaller portions than less vulnerable portions prior to the file being identified as infected.

* * * * *